United States Patent [19]

Silvey

[11] Patent Number: 4,865,697
[45] Date of Patent: Sep. 12, 1989

[54] FLASHING FEED INLET IN A VAPOR/LIQUID CONTACTING TOWER AND METHOD

[75] Inventor: Frank C. Silvey, Plainsboro, N.J.
[73] Assignee: Mobil Oil Corp., New York, N.Y.
[21] Appl. No.: 108,600
[22] Filed: Oct. 15, 1987
[51] Int. Cl.$^4$ .......................... B01D 3/06; B01D 3/14
[52] U.S. Cl. ........................ 203/40; 203/88; 159/2.1; 159/43.1; 202/176; 202/197
[58] Field of Search .............. 203/88, 40; 202/177, 202/176, 197, 159; 208/352, 361; 196/114, 135, 127; 159/43.1, 2.1; 122/40; 261/110

[56] References Cited

U.S. PATENT DOCUMENTS

| | | | |
|---|---|---|---|
| 2,730,170 | 1/1956 | Bradford et al. | 159/2.1 |
| 2,768,940 | 10/1956 | Kupp | 203/88 |
| 2,843,534 | 7/1958 | Harper | 203/88 |
| 2,868,714 | 1/1959 | Gilmore | 196/114 |
| 2,897,147 | 7/1959 | Lely et al. | 196/114 |
| 3,057,786 | 10/1962 | Waddill | 203/88 |
| 3,080,300 | 3/1963 | Smith | 202/159 |
| 3,326,640 | 6/1967 | Egly | 203/88 |
| 3,461,038 | 8/1969 | Lind | 203/88 |
| 4,770,747 | 9/1988 | Muller | 202/176 |

FOREIGN PATENT DOCUMENTS 1519985  4/1981  Fed. Rep. of Germany ....... 159/2.1

Primary Examiner—Wilbur Bascomb
Attorney, Agent, or Firm—Alexander J. McKillop; Charles J. Speciale; Stanislaus Aksman

[57] ABSTRACT

A flashing feed inlet device is used in a vapor/liquid contacting column, such as a distillation column, to decrease the amount of liquid entrainment and maldistribution of vapor occurring when the liquid feed stream is introduced into the column at a temperature and/or pressure conditions higher than those existing in the column. The entrainment of the liquid and the maldistribution of the vapor are decreased by substantially decreasing the linear velocity of the vapor produced by the flashing of the liquid feed stream.

13 Claims, 1 Drawing Sheet

FLASHING FEED INLET IN A VAPOR/LIQUID CONTACTING TOWER AND METHOD

BACKGROUND OF THE INVENTION

I. Field of the Invention

This invention is directed to a flashing feed inlet used in a separation tower and to a method of introducing a substantially liquid feed stream into the separation tower which, after flashing, reduces the entrainment of the liquid portion of the feed in the vapor and the maldistribution of the vapor portion of the feed.

II. Description of the Prior Art

Vapor/liquid separation towers, such as distillation columns, are extensively used in chemical engineering industries. The towers efficiently and effectively separate the feedstock introduced thereinto into a number of desired fractions if the feedstock is introduced into the column at the conditions of temperature and pressure substantially equal to or lower than those prevailing within the column. However, if the temperature and/or pressure of the feedstock introduced into the column is higher than that prevailing within it, a steady-state upsetting condition known as "flashing" will occur in the column. Flashing vaporizes at least a portion of the feed and produces vapor at a very high velocity, e.g., 50 feet per second (ft/sec), which causes the entrainment of a substantial amount of the liquid portion of the feedstock in the vapor and maldistribution of the vapor. The entrainment of the liquid portion of the feedstock and/or maldistribution of the vapor portion of the feed decrease the efficiency of the separation tower.

Heretofore-known devices for promoting a uniform distribution of the feedstock in the tower did not address the problem of flashing of the feedstock. The emphasis has been placed instead on the efficient distribution of the liquid feedstock introduced into the column and the phenomenon of flashing of the portion of the liquid feedstock into vapor was either not recognized or not addressed by those skilled in the art.

Accordingly, it is a primary object of the present invention to provide a method and apparatus minimizing the adverse effects of flashing experienced upon the introduction of a liquid feed having higher temperature and/or pressure than those within the separation tower into which the feed is introduced.

Additional objects of the invention will become apparent to those skilled in the art from the following description thereof.

SUMMARY OF THE INVENTION

The liquid feed stream, having the temperature and/or pressure higher than those existing in the separation tower, is introduced into the column through a flashing feed inlet located inside the column. The construction of the flashing feed inlet is such that substantially all of the vapor is separated from the liquid, thereby minimizing the entrainment of the liquid in the vapor. The flashing feed inlet has a sufficient cross-sectional area to decrease the linear velocity of the combined liquid/vapor stream to not less than about 3 ft/sec.

The flashing feed inlet comprises a feed pipe means containing at least one opening, the total cross-sectional area of the opening(s) being sufficient to decrease the linear velocity of the combined liquid/vapor feed stream to not less than about 3 ft/sec., and a flashing chamber, operatively connected to the feed pipe means, having a sufficient cross-sectional area to promote the disengagement of the vapor from the liquid.

DETAILED DESCRIPTION OF THE INVENTION

Figure 1:
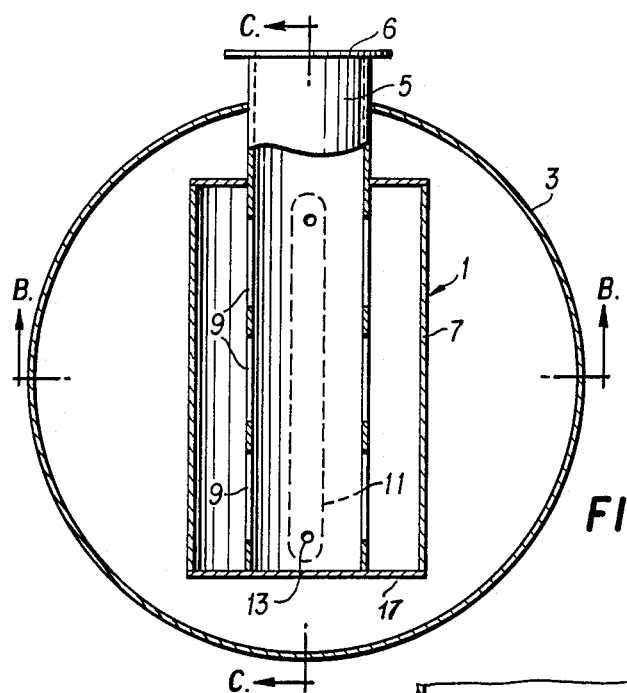
FIG. 1 is a top view of one exemplary embodiment of the present invention.

The vapor/liquid separation tower used with the flashing feed inlet of the present invention may be any of the conventional, well-known vapor/liquid separation towers used heretofore to separate a liquid feed stream into a series of distinct liquid and vapor fractions. Suitable separation towers are distillation and gas absorber columns operated over a pressure range from vacuum to very high pressure. The type of the feed stream introduced into the column would depend on the type of material to be separated in the tower, and therefore the nature thereof is not critical to the present invention, so long as the temperature and/or pressure of the feedstream is higher than those existing within the tower.

The flashing feed inlet is located inside the column so that the feed stream introduced into the column must pass through the flashing feed inlet. The flashing feed inlet comprises a feed pipe extending in a direction perpendicular to the sidewall of the column and, surrounding but spaced by some distance from the feed pipe, a flashing chamber. The feed pipe contains at least one side opening, and preferably a number of side openings, with all of the openings having a sufficient cross-sectional area to reduce the velocity of the feedstream comprising the liquid feed and the vapor, produced in the feed pipe openings due to flashing of the liquid feed, thereby minimizing the entrainment of liquid in the vapor ascending within the tower. The cross-sectional area of the openings must be sufficient to reduce the velocity of the liquid and vapor portions of the flashed feed to not less than about 3 ft/sec, preferably to about 3 to about 7 ft/sec, and most preferably to about 3 ft/sec. The openings of the pipe are cut in the feed pipe at such an angle as to promote the impingement of the majority of the liquid portion of the feed onto the side walls of the flash chamber surrounding the feed pipe to minimize the amount of the liquid, if any, traveling upwardly through the separation tower. This, in turn, minimizes the entrainment of the liquid in the vapor. Thus, the angle of the pipe openings (referred to herein as angle $\alpha$ and defined as an angle between the horizontal axis and the upper edge of each opening—see FIG. 2) is not greater than about 8°, and most preferably it is about 7° below or above the horizontal axis.

The feed pipe is sized to accommodate the rate of flow of feed streams introduced into the tower, and it is preferably circular in cross-section.

The flash chamber, also referred to herein as a flashing chamber, surrounding the feed pipe must be sized so as to provide a sufficient cross-sectional area to reduce the linear velocity of the vapor produced by flashing to a value approaching the superficial vapor velocity within the tower, thereby separating substantially completely the vapor and the liquid resulting from the flashing of the feed stream. The reduction of the velocity of the vapor to that level reduces the amount of the liquid portion of the feed entrained within the vapor. The flash chamber may be of any convenient shape, e.g., semi-circular or rectangular.

The feed pipe contains two openings in the bottom thereof to allow the liquid to drain from the pipe and into the flashing chamber around the feed pipe during shutdowns. The vapor and liquid exit from the feed pipe through the one or more side openings therein, described above. The flashing chamber contains at least one and preferably several openings in the bottom thereof to allow the liquid to be conducted to the separation tray directly beneath the flashing feed inlet. The size of the openings in the bottom of the flashing chamber will also depend, as will be apparent to those skilled in the art, on the nature of the feed, the application of the flashing feed inlet means of the invention, and the nature of the feedstock being processed in the tower. The materials of construction of the flashing feed inlet of the invention will also be selected depending on the type of the feedstock being processed, operating conditions in the tower, and other process conditions obvious to those skilled in the art.

In operation, an existing vapor/liquid contacting column, such as a distillation column, is modified by incorporating the flashing feed inlet device of the present invention within the tower at the inlet thereof. The flashing feed inlet is normally placed in-between two distillation column trays to allow the vapor to rise to the upper tray and the liquid to fall to the lower tray. The device is placed at the same vertical elevation in the column as the conventional feed inlet in the column.

The invention will now be described in conjunction with one exemplary embodiment thereof which is presented herein only for purposes of illustration.

Figure 2:
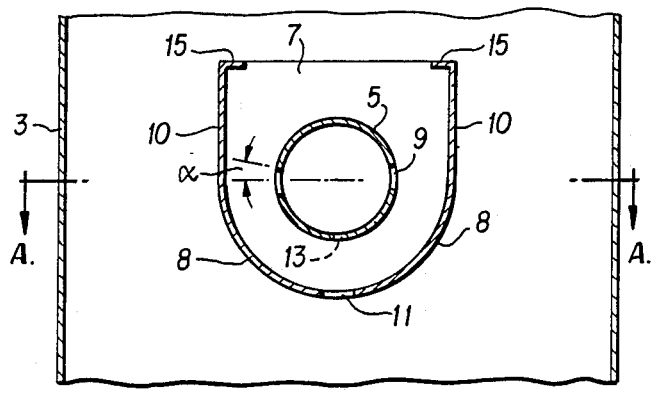
FIG. 2 is a view of Section B—B of FIG. 1.
Figure 3:
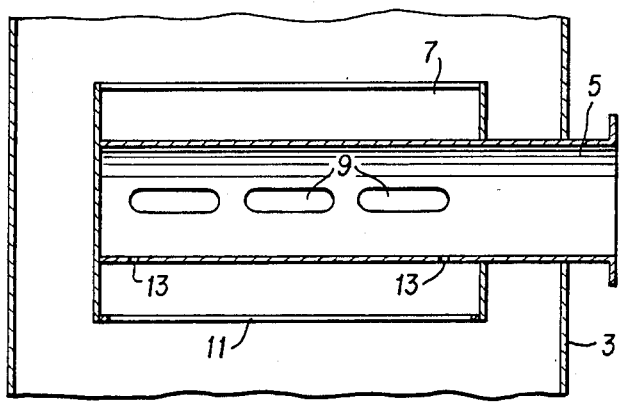
FIG. 3 is a view of Section C—C of FIG. 1.

FIG. 1 illustrates the top view of the flashing feed inlet device 1 positioned within a distillation column 3. The flashing feed inlet device comprises a feed pipe 5 having an inlet 6 positioned on the outside of the distillation column, and a flashing chamber 7 surrounding the feed pipe as shown in more detail in FIG. 2. The flashing chamber comprises a semi-circular bottom portion 8 and two sidewalls 10 attached to the bottom portion and terminating in two lip sections 15 which provide structural rigidity and prevent liquid creeping up the inner wall of the device. The feed pipe 5 contains a number of side slots 9 which reduce the velocity of the feed stream introduced into the flash chamber. The edge of each side slot is at an angle $\alpha$ with respect to the horizontal line (FIG. 2). In the exemplary embodiment of the invention of FIG. 2, the angle $\alpha$ is 7°. It also contains two drain holes 13 (FIG. 2) which allow the liquid to be drained at shutdown from the feed pipe into the flash chamber 7. The flash chamber 7 contains a bottom slot 11 which, in turn, allows the liquid to exit from the flashing feed inlet and enter one of the lower trays in the distillation column. The end plate 17 closes off the end portion of the flashing feed inlet.

In one example of operation of the column, the feed stream is introduced outside of the distillation column through an inlet 6 of the feed pipe and it is conducted in a horizontal direction into the distillation column along the length of the feed pipe. The side slots 9 reduce the linear velocity of the feed stream, comprising both, liquid and vapor, to about 3 ft/sec. and force the feed to strike the sidewalls 10 which promotes the disengagement of the vapor from the liquid. The vapor portion of the feed stream exits upwardly and is transported to the upper trays of the distillation column. The liquid portion of the feedstream is transported through a bottom slot 11 of the flash chamber 7 to a tray immediately beneath the flashing feed inlet. The flash chamber has such a cross-sectional area that the linear velocity of the vapor portion of the feed stream is reduced to a value approaching the superficial vapor velocity within the tower.

It will be apparent to those skilled in the art that the specific embodiments discussed above can be successfully repeated with components equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A method of introducing a liquid feed stream into a distillation tower, the feed stream having a temperature and/or pressure higher than those existing in the tower, comprising introducing the feed stream into the tower through a flashing feed inlet located inside the tower, whereby at least a portion of the feed stream is converted to a vapor, the feed stream being introduced initially through a feed pipe means containing at least one side opening cut at an angle $\alpha$ of not greater than about 8° below or above the horizontal axis, wherein the angle $\alpha$ is defined as an angle between the horizontal axis and the upper edge of the side opening, the side opening having a sufficient cross-sectional area to reduce the linear velocity of the feed stream to not less than about 3 feet/second, the feed stream exiting the side opening and entering a flashing chamber which is operatively connected to, spaced from and which surrounds the feed pipe means, the feed stream striking the flashing chamber, which thereby promotes the separation of the vapor from the liquid, the flashing feed inlet decreasing the linear velocity of the vapor to substantially the superficial vapor velocity within the tower, thereby additionally promoting the disengagement of the vapor from the liquid and minimizing the maldistribution of the vapor in the tower.

2. A method of claim 1 wherein the feed pipe means decreases the linear velocity of the feed stream to about 3 to about 7 ft/sec.

3. A method of claim 2 wherein the feed pipe means decreases the linear velocity of the feed stream to about 3 ft/sec.

4. A method of claim 2 wherein the vapor exits the flashing feed inlet and is conducted upwardly to the upper trays of the tower.

5. A method of claim 4 wherein the liquid is conducted to a tray immediately beneath the flashing feed inlet.

6. A flashing feed inlet means for introducing a liquid feed stream into a distillation column, the feed stream having a temperature and/or pressure higher than those existing in the column, the flashing feed inlet means being mounted in the column perpendicularly to the direction of flow of gases and liquids within the column and comprising:

A. a feed pipe means containing at least one side opening cut at an angle $\alpha$ of not greater than about 8° below or above the horizontal axis, wherein the angle $\alpha$ is defined as an angle between the horizontal axis and the upper edge of the side opening, and at least one opening in the bottom of the feed pipe, the total cross-sectional area of the side opening being sufficient to decrease the linear velocity of the feed stream to not less than about 3 ft/sec, and B. a flashing chamber, operatively connected to, spaced from and surrounding said feed pipe means, having a sufficient cross-sectional area to decrease the linear velocity of a vapor, produced by flashing of at least a portion of the feed stream in the flashing feed inlet means, to a value substantially the same as the superficial vapor velocity within the column, the flashing chamber additionally providing a surface for the feed stream to strike, thereby promoting the separation of the vapor from the liquid.

7. A flashing feed inlet means of claim 6 wherein the total cross-sectional area of the side opening of the feed pipe means is sufficient to decrease the linear velocity of the feed stream to about 3 to about 7 ft/sec.

8. A flashing feed inlet means of claim 7 wherein the total cross-sectional area of the side opening of the feed pipe means is sufficient to decrease the linear velocity of the feed stream to about 3 ft/sec.

9. A flashing feed inlet means of claim 8 wherein the flashing chamber comprises a substantially semi-circular bottom section having one vertically-extending side wall attached to each end of the bottom section.

10. A flashing feed inlet means of claim 9 wherein the semi-circular bottom section contains at least one opening in the lowest portion thereof to allow liquid flow.

11. A flashing feed inlet means of claim 10 wherein each of the vertically-extending sidewalls contains a lip section at the top thereof.

12. A flashing feed inlet means of claim 11 wherein the feed pipe means contains a plurality of side openings and at least one opening in the bottom thereof.

13. A flashing feed inlet of claim 12 wherein the angle $\alpha$ is about 7° below or above the horizontal axis.

* * * * *